United States Patent
Shukla et al.

(10) Patent No.: US 12,260,304 B2
(45) Date of Patent: Mar. 25, 2025

(54) STAGGERED-SAMPLING TECHNIQUE FOR DETECTING SENSOR ANOMALIES IN A DYNAMIC UNIVARIATE TIME-SERIES SIGNAL

(71) Applicant: Oracle International Corporation, Redwood Shores, CA (US)

(72) Inventors: Neelesh Kumar Shukla, Madhapur (IN); Saurabh Thapliyal, Berkeley, CA (US); Matthew T. Gerdes, Oakland, CA (US); Guang C. Wang, San Diego, CA (US); Kenny C. Gross, Escondido, CA (US)

(73) Assignee: Oracle International Corporation, Redwood City, CA (US)

( * ) Notice: Subject to any disclaimer, the term of this patent is extended or adjusted under 35 U.S.C. 154(b) by 1043 days.

(21) Appl. No.: 17/205,445

(22) Filed: Mar. 18, 2021

(65) Prior Publication Data
US 2022/0300737 A1    Sep. 22, 2022

(51) Int. Cl.
*G06N 20/00* (2019.01)
*G06F 18/21* (2023.01)
*G06N 5/04* (2023.01)

(52) U.S. Cl.
CPC .......... *G06N 20/00* (2019.01); *G06F 18/217* (2023.01); *G06N 5/04* (2013.01); *G06F 2218/02* (2023.01);
(Continued)

(58) Field of Classification Search
CPC ...... G06N 20/00; G06N 5/04; G06F 2218/00; G06F 2218/02; G06F 2218/04;
(Continued)

(56) References Cited

U.S. PATENT DOCUMENTS

| | | | |
|---|---|---|---|
| 11,397,083 B1* | 7/2022 | Larson | G01C 19/50 |
| 2015/0106058 A1* | 4/2015 | Mazzaro | G01M 99/005 |
| | | | 702/181 |
| 2017/0351964 A1* | 12/2017 | Gross | G06F 13/37 |

OTHER PUBLICATIONS

NPL BrownLee A Gentle Introduction to Autocorrelation 2020.*
(Continued)

*Primary Examiner* — Paul M Knight
(74) *Attorney, Agent, or Firm* — Park, Vaughan, Fleming & Dowler LLP

(57) ABSTRACT

The disclosed embodiments provide a system that detects sensor anomalies in a univariate time-series signal. During a surveillance mode, the system receives the univariate time-series signal from a sensor in a monitored system. Next, the system performs a staggered-sampling operation on the univariate time-series signal to produce N sub-sampled time-series signals, wherein the staggered-sampling operation allocates consecutive samples from the univariate time-series signal to the N sub-sampled time-series signals in a round-robin ordering. The system then uses a trained inferential model to generate estimated values for the N sub-sampled time-series signals based on cross-correlations with other sub-sampled time-series signals. Next, the system performs an anomaly detection operation to detect incipient sensor anomalies in the univariate time-series signal based on differences between actual values and the estimated values for the N sub-sampled time-series signals. Whenever an incipient sensor anomaly is detected, the system generates a notification.

20 Claims, 4 Drawing Sheets

(52) U.S. Cl.
CPC ...... *G06F 2218/18* (2023.01); *G06F 2218/22* (2023.01)

(58) Field of Classification Search
CPC ............. G06F 2218/06; G06F 2218/08; G06F 2218/10; G06F 2218/12; G06F 2218/14; G06F 2218/16; G06F 2218/18; G06F 2218/20
See application file for complete search history.

(56) References Cited

OTHER PUBLICATIONS

NPL Gross Round Robin Staggered Imputation RRSI 2016.*
NPL He autocorrelation based strategy for multiple fault feature extraction 2020.*
NPL Kostelich Noise reduction in chaotic time series data survey 1993.*
NPL Marinez Acoustic signal detection through the cross correlation 2015.*
NPL Serdio Fault detection in multi sensor networks 2014.*
NPL Srinivas Reducing the Noise Floor 2020.*
NPL Tootooni A Spectral Graph Theoretic Approach 2018.*
NPL Wei A Review of Early Fault Diagnosis Approaches 2019.*
NPL Yang Vibration condition monitoring system 2016.*
NPL Yao DeepSense a Unified Deep Learning Framework 2017.*

\* cited by examiner

STAGGERED-SAMPLING TECHNIQUE FOR DETECTING SENSOR ANOMALIES IN A DYNAMIC UNIVARIATE TIME-SERIES SIGNAL

BACKGROUND

Field

The disclosed embodiments generally relate to techniques for performing prognostic-surveillance operations based on time-series sensor signals from a monitored system. More specifically, the disclosed embodiments relate to a staggered-sampling technique that makes use of an inferential model to detect sensor anomalies in a dynamic univariate time-series signal.

Related Art

Prognostic-surveillance techniques based on time-series sensor signals are presently being used to facilitate proactive maintenance for critical assets across multiple industries, including manufacturing, oil & gas, utilities, transportation, and avionics. In typical use cases, multiple sensors are used to monitor critical assets, wherein signals from these multiple sensors have some degree of correlation because of associated physical variable interactions in the assets. For example, a simple rotating machine may have multiple correlated variables such as rotational speed, motor current, vibration levels, and internal temperatures at various measurement points. In such systems, which possess multiple correlated sensor signals, it is possible to detect anomalies by using multivariate regression techniques to determine when one or more signals drift out of correlation with other signals.

For use cases that involve univariate time-series signals, which are not correlated, the sequential probability ratio test (SPRT) can be used to detect anomalies if the time-series signals are stationary. Note that we use the term "stationary" in the statistical sense, i.e., with a nominally flat mean and superimposed measurement noise. For stationary univariate time-series signals, SPRT is ideal, because it has been proven that SPRT has the shortest mathematically possible time-to-detect metric for recognizing the onset of subtle anomalies in noisy stationary signals. SPRT also provides the lowest mathematically possible false-alarm and missed-alarm probabilities (FAPs and MAPs). Note that high FAPs can be very costly because they can cause revenue-generating assets to be taken out of service unnecessarily, and high MAPs can be catastrophic because they can lead to very expensive failures (and in some cases loss-of-life events).

Although SPRT has proven to be effective at detecting anomalies in stationary univariate signals, it cannot be used to detect anomalies in dynamic univariate signals. If a time-series is dynamic, and there is only one sensor, then there are no correlated signals with which to discover deviations from expectation. For a narrow class of dynamic signals with repeating patterns, it is possible to learn the repeating patterns, and then discover an anomaly in the repeating patterns. Two such examples are: periodic patterns, and non-periodic but repeating "shapelets" in the signals. For periodic patterns, a Fourier decomposition can be used to break the composite signal into an envelope of superimposed sinusoids, which can be monitored to detect a change in sinusoidal amplitudes or frequencies. For non-periodic but repeating patterns, a shapelet-based approach such as Symbolic Aggregate approXimation (SAX) can be used.

However, a class of univariate signals that presents a significant challenge in terms of anomaly discovery is signals with non-repeating serial correlation (also called autocorrelation) and superimposed measurement noise. If the dynamic patterns in the univariate signal are truly non-repeating, and there is only one sensor, then it is intractable to discover an anomaly in the structural content for the signal. In spite of this fact, there still exist significant advantages in being able to detect the onset of anomalies in the sensors that are used to monitor an asset. For prognostic-surveillance applications across multiple industries, sensor problems are a leading cause of false alarms and missed alarms. Common sensor degradation modes include: linear decalibration bias in sensors; intermittent "stuck-at" faults; the onset of spikiness; and a change in gain without a corresponding change in mean. Note that it is often the case that the sensors have a shorter mean time between failures (MTBF) than the assets the sensors are intended to protect.

Hence, what is needed is a technique for detecting the onset of sensor anomalies in univariate signals with non-repeating serial correlation and superimposed measurement noise.

SUMMARY

The disclosed embodiments relate to a system that detects sensor anomalies in a univariate time-series signal. During a surveillance mode, the system receives the univariate time-series signal from a sensor in a monitored system. Next, the system performs a staggered-sampling operation on the univariate time-series signal to produce N sub-sampled time-series signals, wherein the staggered-sampling operation allocates consecutive samples from the univariate time-series signal to the N sub-sampled time-series signals in a round-robin ordering. The system then uses a trained inferential model to generate estimated values for the N sub-sampled time-series signals based on cross-correlations with other signals in the N sub-sampled time-series signals. Next, the system performs an anomaly detection operation to detect incipient sensor anomalies in the univariate time-series signal based on differences between actual values and the estimated values for the N sub-sampled time-series signals. Then, whenever an incipient sensor anomaly is detected, the system generates a notification.

In some embodiments, while performing the anomaly detection operation, the system first performs a pairwise differencing operation between the actual values and the estimated values for the N sub-sampled time-series signals to produce residuals. Next, the system performs a sequential probability ratio test (SPRT) on the residuals to produce SPRT alarms with associated tripping frequencies. Finally, the system detects incipient sensor anomalies based on the tripping frequencies.

In some embodiments, during a preceding training mode, the system receives a prior univariate time-series signal from the sensor in the monitored system during normal fault-free operation. Next, the system performs a staggered-sampling operation on the prior univariate time-series signal to produce training data comprising N prior sub-sampled signals. The system then divides the training data into a training set and a validation set. Next, the system uses the training set to train the inferential model to predict values of the N prior sub-sampled time-series signals based on cross-correlations with other signals in the N prior sub-sampled time-series signals. Finally, the system uses the validation set to test the trained inferential model.

In some embodiments, the incipient sensor anomalies include one of the following: a linear decalibration bias in a sensor; an intermittent stuck-at fault in a sensor; an onset of spikiness in a sensor transducer; a sensor becoming unresponsive to high-frequency fluctuations; and a changing gain failure in a sensor.

In some embodiments, the inferential model comprises one of the following: a multivariate state estimation technique (MSET) model; a neural network model; a support vector machine (SVM) model; an auto-associative kernel model; and a regression model.

In some embodiments, receiving the univariate time-series signal comprises receiving multiple univariate time-series signals. In these embodiments, the system performs the staggered-sampling operation, the value-estimation operation and the anomaly-detection operation for each of the multiple univariate time-series signals.

In some embodiments, the sensor in the monitored system comprises one of the following: a pressure sensor; a vibration sensor; a control signal sensor; a current sensor; a high frequency current transformer (HFCT) sensor; a voltage sensor; a power sensor; a resistance sensor; a capacitance sensor; a thermal sensor; a fiber Bragg grating (FBG) optical thermographic sensor; a pixelated infrared 2D thermographic sensor; a bore-hole logging sensor (including gamma and neutron instrumentation); a sensor associated with well drilling; a sensor associated with a refinery; an accelerometer (monoaxial, biaxial or triaxial); a rotational sensor (for any and all assets involving rotating machinery, such as pumps, turbines, blowers, fans, motor/generators, etc.); a tachometer; a proximity-transducer-based sensor for a rotating shaft; a fluid flow sensor (including Venturi-flow sensors and electrohydrodynamic (EHD) flow sensors for conductive fluids); a relative humidity sensor; an anemometric sensor; a time-domain reflectometry (TDR) sensor (for signal and interconnect integrity validation); an ultra high frequency (UHF) sensor; an acoustic sensor; and a flexible magnetic coupler (FMC) sensor.

In some embodiments, N≤10.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Exemplary Prognostic-Surveillance System

Figure 1:
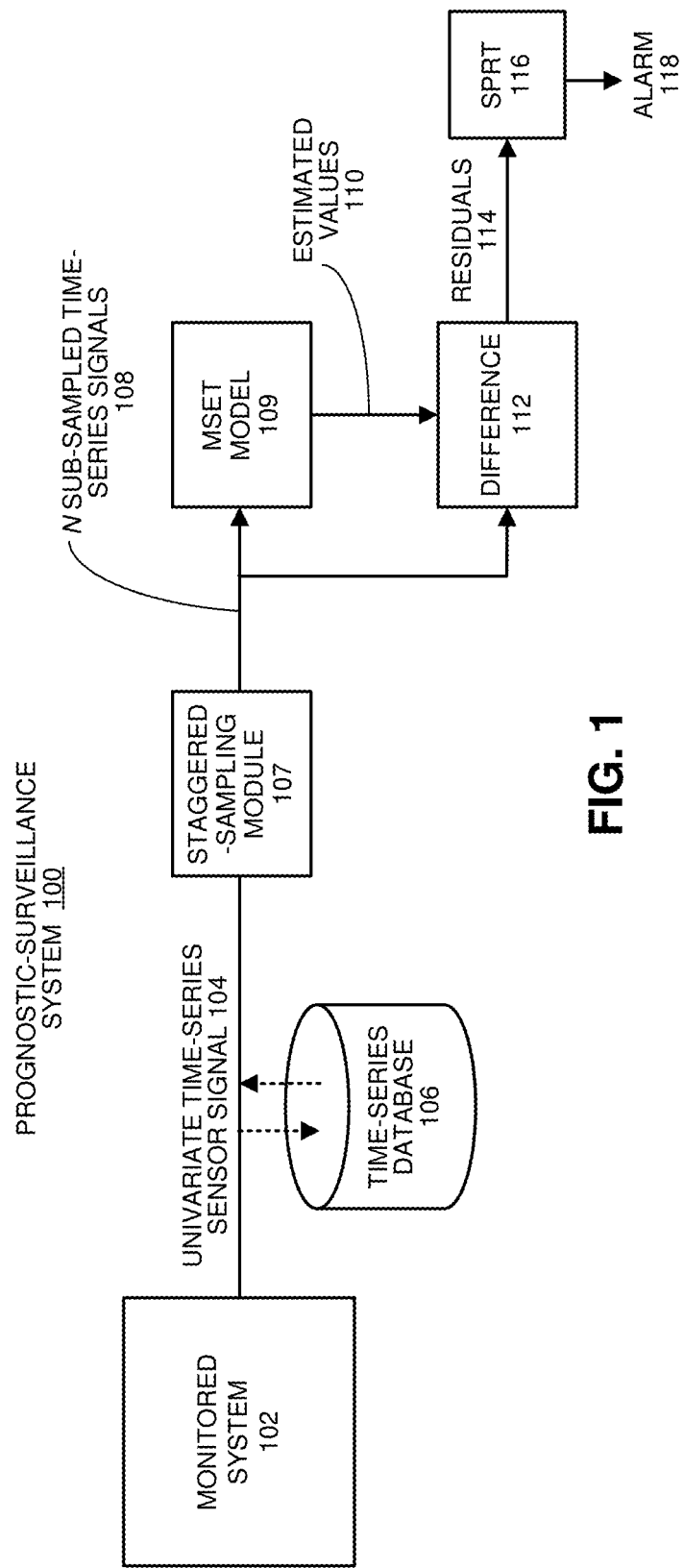
FIG. 1 illustrates an exemplary prognostic-surveillance system in accordance with the disclosed embodiments.

Before describing our staggered-sampling technique further, we first describe an exemplary prognostic-surveillance system in which the technique can be used. FIG. 1 illustrates a prognostic-surveillance system 100 that accesses a time-series database 106, containing time-series signals in accordance with the disclosed embodiments. As illustrated in FIG. 1, prognostic-surveillance system 100 operates on a univariate time-series sensor signal 104 obtained from a sensor in a monitored system 102. Note that monitored system 102 can generally include any type of machinery or facility, which includes sensors and generates time-series signals. Moreover, time-series signal 104 can originate from any type of sensor, which can be located in a component in monitored system 102, including: a temperature sensor; a pressure sensor; a rotational speed sensor; a vibration sensor; a control signal sensor; a current sensor; a voltage sensor; a resistance sensor; and a capacitance sensor.

During operation of prognostic-surveillance system 100, time-series signal 104 can feed into a time-series database 106, which stores the time-series signal 104 for subsequent analysis. Next, the time-series signal 104 either feeds directly from monitored system 102 or from time-series database 106 into a staggered-sampling module 107, which performs a staggered-sampling operation to produce N sub-sampled time-series signals 108. During this staggered-sampling operation, staggered-sampling module 107 allocates consecutive samples from the univariate time-series signal 104 to the N sub-sampled time-series signals 108 in a round-robin ordering.

Next, the N sub-sampled time-series signals 108 feed into a Multivariate State Estimation Technique (MSET) pattern-recognition model 109. Although it is advantageous to use an inferential model, such as MSET, for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

The MSET model 109 is then trained to learn patterns of correlation among all of the time-series signals 104. This training process involves a one-time, computationally intensive computation, which is performed offline with accumulated data that contains no anomalies. The pattern-recognition system is then placed into a "surveillance mode," wherein the trained MSET model 109 predicts what each of the N sub-sampled time-series signals 108 should be based on correlations with the other sub-sampled time-series signals to produce estimated values 110 for the N sub-sampled time-series signals based on cross-correlations with other signals in the N sub-sampled time-series signals.

Next, the system uses a difference module 112 to perform a pairwise differencing operation between actual and estimated values for the N sub-sampled time-series signals to produce residuals 114. The system then performs a "detection operation" on the residuals 114 by using SPRT module 116 to detect anomalies and possibly to generate an alarm 118. (For a description of the SPRT model, please see Wald, Abraham, June 1945, "Sequential Tests of Statistical Hypotheses." Annals al Mathematical Statistics. 16 (2): 117-186.) In this way, prognostic-surveillance system 100 can proactively alert system operators about incipient sensor anomalies, hopefully with enough lead time so that such problems can be avoided or proactively fixed.

Figure 2:
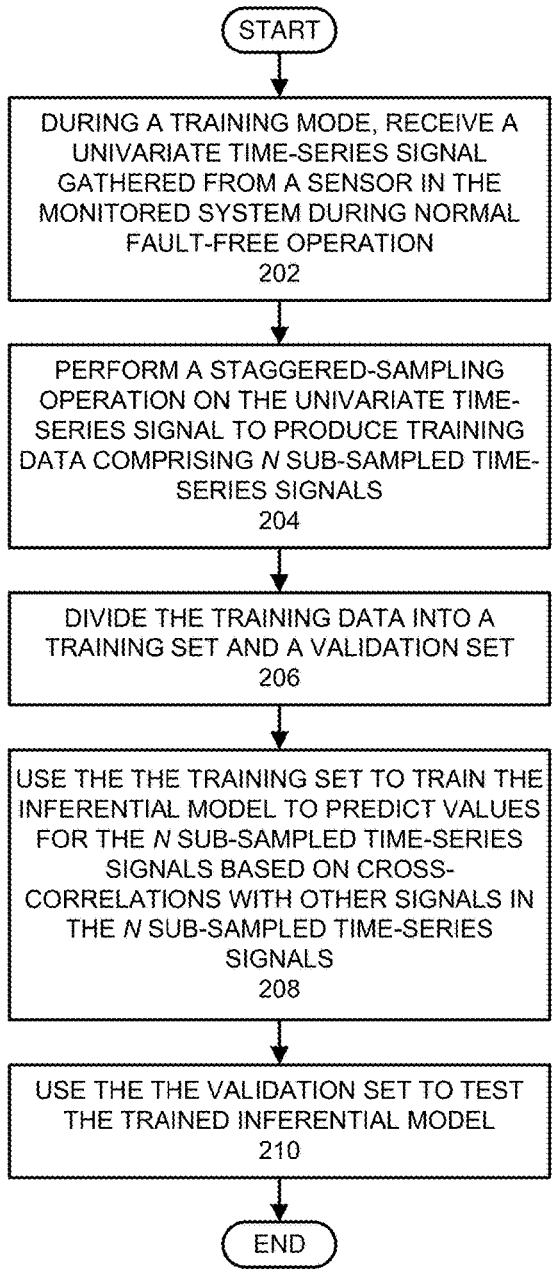
FIG. 2 presents a flow chart illustrating a process for training an inferential model in accordance with the disclosed embodiments.

The prognostic surveillance system 100 illustrated in FIG. 1 operates generally as follows. During a training mode, which is illustrated in the flow chart in FIG. 2, the system receives a univariate time-series signal from a sensor in the monitored system during normal fault-free operation (step 202). Next, the system performs a staggered-sampling operation on the univariate time-series signal to produce training data comprising N sub-sampled time-series signals (step 204). The system then divides the training data into a training set and a validation set (step 206). Next, the system uses the training set to train the inferential model to predict values for the N sub-sampled time-series signals based on cross-correlations with other signals in the N sub-sampled time-series signals (step 208). Finally, the system uses the validation set to test the trained inferential model (step 210).

Figure 3:
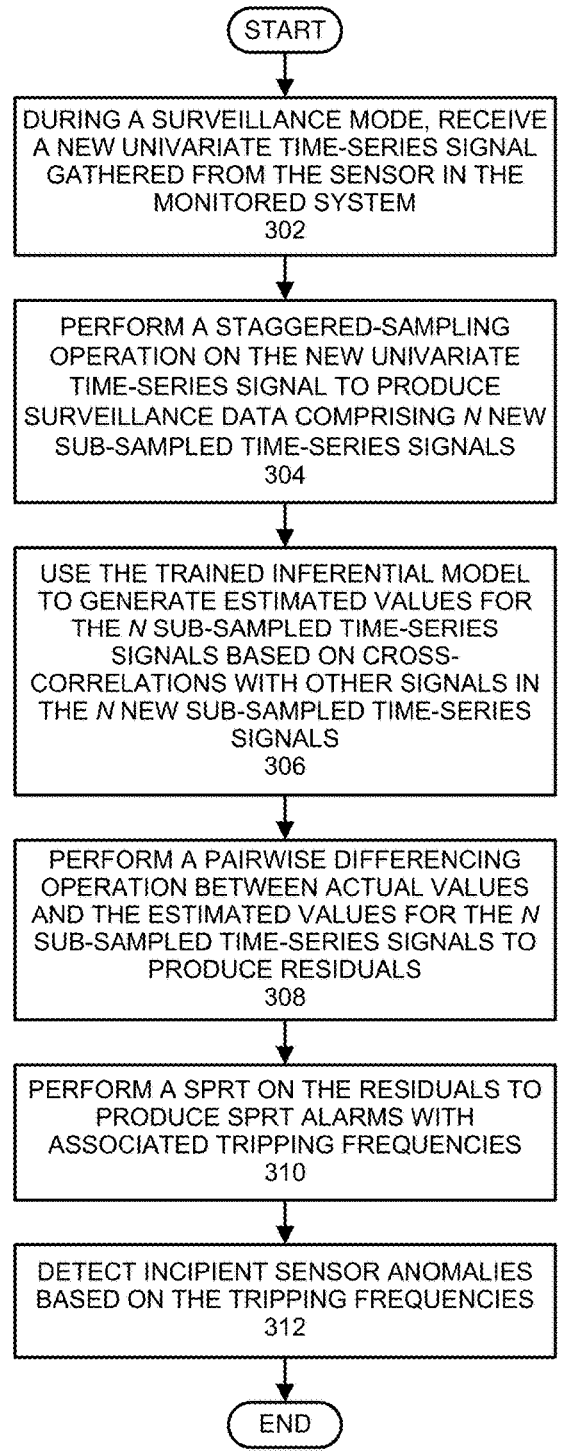
FIG. 3 presents a flow chart illustrating a process for using an inferential model to perform prognostic-surveillance operations in accordance with the disclosed embodiments.

During a subsequent surveillance mode, which is illustrated by the flow chart in FIG. 3, the system receives a new univariate time-series signal gathered from the sensor in the monitored system (step 302). Next, the system performs a staggered-sampling operation on the new univariate time-series signal to produce surveillance data comprising N new sub-sampled time-series signals (step 304). The system then uses the inferential model to generate estimated values for the N sub-sampled time-series signals based on cross-correlations with other signals in the N new sub-sampled time-series signals (step 306). Next, the system performs a pairwise differencing operation between actual values and the estimated values for the N sub-sampled time-series signals to produce residuals (step 308). The system then analyzes the residuals to detect incipient sensor anomalies in the monitored system. This process involves performing a SPRT on the residuals to produce SPRT alarms with associated tripping frequencies (step 310), and then detecting incipient sensor anomalies based on the tripping frequencies (step 312).

Details

For any digitized dynamic time-series signal that exhibits dynamic behavior during operation of the system the sensor is monitoring, we begin by decomposing the signal into a set of correlated sub-sampled time-series signals through a process we refer to as "staggered sampling." In a simple example, we decompose an original univariate time-series signal comprised of observations (1, 2, 3, . . . ) into three sub-sampled time-series signals X, Y, and Z. This involves allocating consecutive samples from the original signal to the three sub-sampled time-series signals X, Y, and Z in a round-robin ordering, so that X comprises observations (1, 4, 7, . . . ), Y comprises observations (2, 5, 8, . . . ) and Z comprises observations (3, 6, 9, . . . ). Now we have the three sub-sampled time-series signals X, Y, and Z, which all have independent measurement noise because the noise-related random components on the original signal are now systematically distributed across the three sub-sampled signals. However, note that the structural components in the three signals, which are not noise-related, remain well-correlated.

We next feed the sub-sampled time-series signals an MSET model, which filters out the dynamic components, because it learns the correlated dynamic components, which are common to all the sub-sampled signals, and filters those dynamics out, leaving noisy "residuals," which are subsequently analyzed using SPRT to detect anomalies. Note that the MSET model learns correlated patterns across all of the N sub-sampled signals. The MSET model is then used to predict what each sub-sampled signal "should be" on the basis of the other N−1 correlated signals. When MSET learns the structural components across the N sub-sampled signals, it is able to predict each sub-sampled signal with high accuracy based on cross-correlation. Note that the MSET model cannot be used to predict the random measurement noise, which we ultimately want to ascertain to detect sensor degradation events. Hence, when the MSET predictions are subtracted from the actual "measured" signals, what remains is the random measurement noise, which we can analyze using a conventional SPRT technique to detect subtle anomalies in the noise patterns to perform sensor operability validation operations.

Figure 4A:
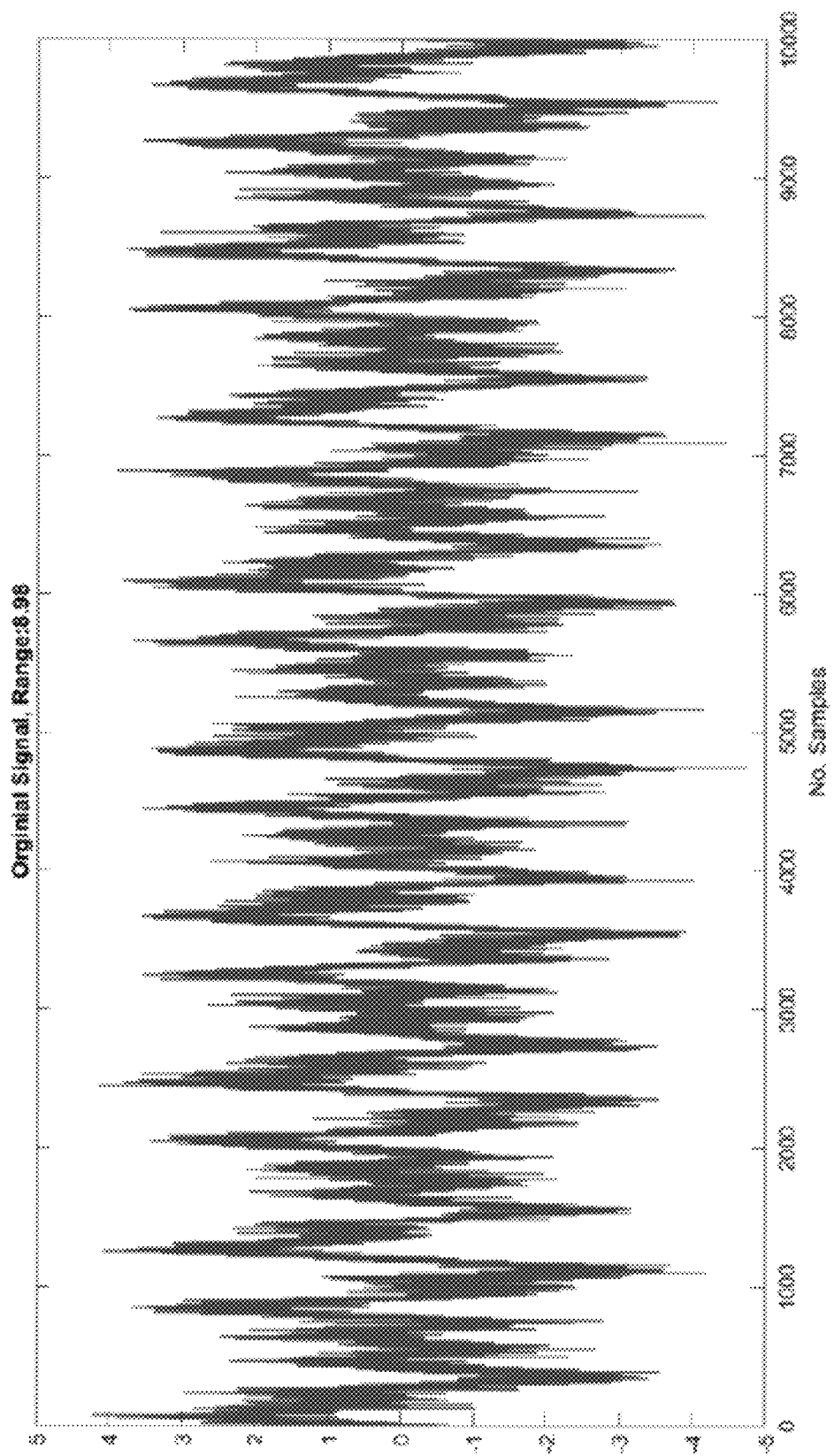
FIG. 4A presents a graph illustrating an original univariate signal in accordance with the disclosed embodiments.
Figure 4B:
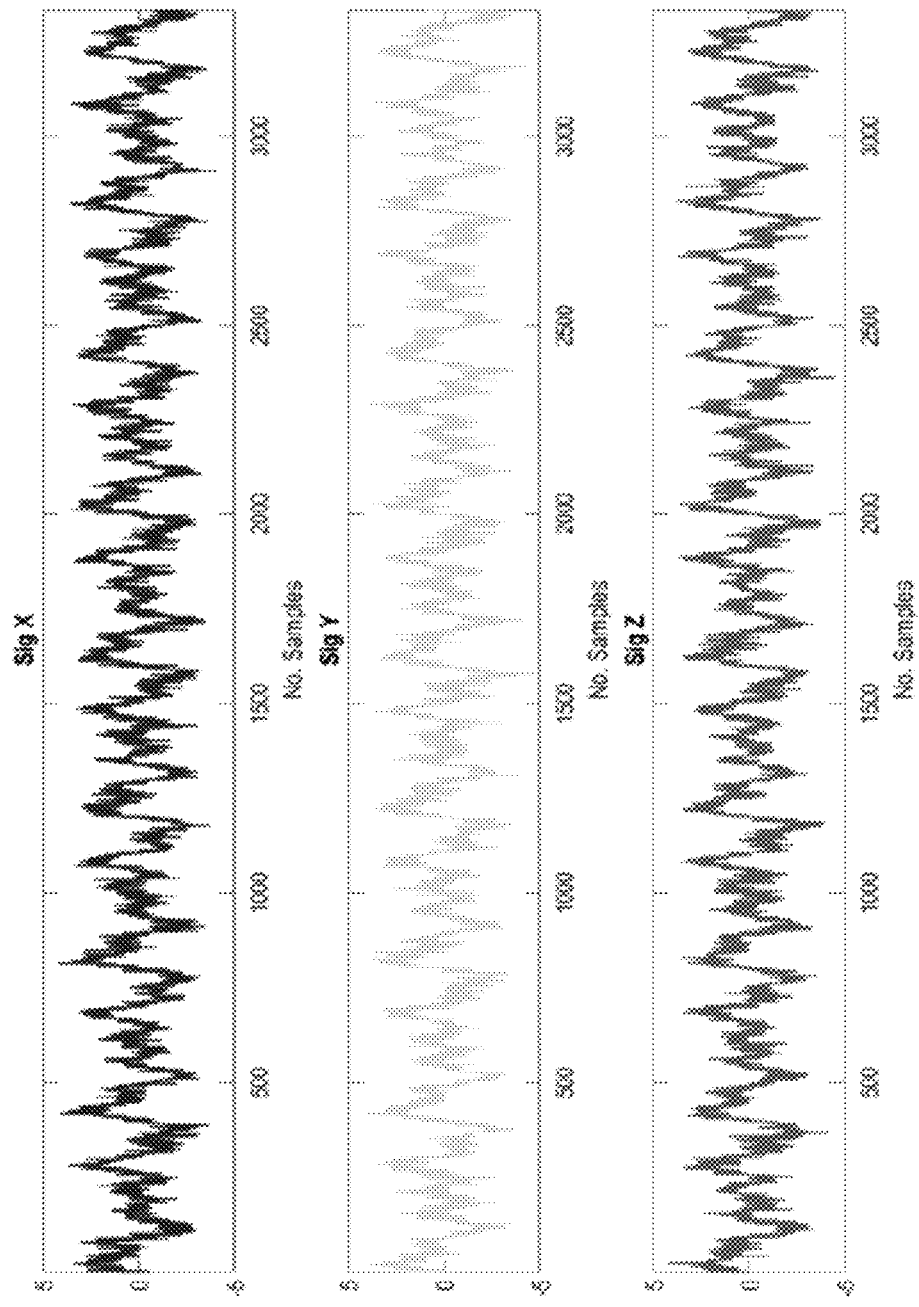
FIG. 4B presents three graphs illustrating three staggered sub-sampled signals derived from the univariate signal illustrated in FIG. 4A in accordance with the disclosed embodiments.

To illustrate the staggered-sampling process, FIGS. 4A-4B illustrate a trivial example with just three sub-sampled time-series signals decomposed from an original univariate time-series signal. More specifically, FIG. 4A illustrates the original univariate time-series signal, and FIG. 4B presents three graphs illustrating three staggered sub-sampled signals derived from the univariate signal illustrated in FIG. 4A. Note that the three sub-sampled signals comprise a lower limit for the intermediate steps of processing the signals using a nonlinear nonparametric regression technique, such as MSET. Although three signals allows the technique to be demonstrated, using more signals yields a superior model for a machine-learning-based prognostic-surveillance technique, such as MSET. Thus, using four signals yields a marginally better prediction of each of the sub-sampled time-series signals, which yields better "residuals," for use in detecting the onset of sensor anomalies.

During our experiments with many types of dynamic univariate signals and with increases in the staggered-sampling decomposition into N sub-sampled time-series signals, we found that by using 10 signals we achieve outstanding performance for detection of sensor anomalies. However, exceeding 10 signals incurs significant additional compute cost with little additional improvement in prognostic accuracy for detecting sensor anomalies. For this reason, we recommend using N=10 signals, which appears to provide a good compromise between compute cost and prognostic accuracy.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for detecting sensor anomalies in a univariate time-series signal, comprising:
   during a surveillance mode, receiving the univariate time-series signal from a sensor in a monitored system;
   performing a staggered-sampling operation on the univariate time-series signal to produce N sub-sampled time-series signals, wherein the staggered-sampling operation allocates consecutive samples from the univariate time-series signal to the N sub-sampled time-series signals in a round-robin ordering;
   using a trained inferential model to generate estimated values for the N sub-sampled time-series signals based on cross-correlations with other signals in the N sub-sampled time-series signals;
   performing an anomaly detection operation to detect incipient sensor anomalies in the univariate time-series signal based on differences between actual values and the estimated values for the N sub-sampled time-series signals; and
   when an incipient sensor anomaly is detected, generating a notification.

2. The method of claim 1, wherein performing the anomaly detection operation comprises:
   performing a pairwise differencing operation between the actual values and the estimated values for the N sub-sampled time-series signals to produce residuals;
   performing a sequential probability ratio test (SPRT) on the residuals to produce SPRT alarms with associated tripping frequencies; and
   detecting incipient sensor anomalies based on the tripping frequencies.

3. The method of claim 1, wherein during a training mode that precedes the surveillance mode, the method further comprises:
   receiving a prior univariate time-series signal from the sensor in the monitored system during normal fault-free operation;
   performing a staggered-sampling operation on the prior univariate time-series signal to produce training data comprising N prior sub-sampled signals;
   dividing the training data into a training set and a validation set;
   using the training set to train the inferential model to predict values of the N prior sub-sampled time-series signals based on cross-correlations with other signals in the N prior sub-sampled time-series signals; and
   using the validation set to test the trained inferential model.

4. The method of claim 1, wherein the incipient sensor anomalies comprise one of the following:
   a linear decalibration bias in a sensor;
   an intermittent stuck-at fault in a sensor;
   an onset of spikiness in a sensor transducer;
   a sensor becoming unresponsive to high-frequency fluctuations; and
   a changing gain failure in a sensor.

5. The method of claim 1, wherein the inferential model comprises one of the following:
   a multivariate state estimation technique (MSET) model;
   a neural network model;
   a support vector machine (SVM) model;
   an auto-associative kernel model; and
   a regression model.

6. The method of claim 1,
   further comprising receiving multiple univariate time-series signals; and
   wherein the method performs the staggered-sampling operation, the value-estimation operation and the anomaly-detection operation for each of the multiple univariate time-series signals.

7. The method of claim 1, wherein the sensor in the monitored system comprises one of the following:
   a pressure sensor;
   a vibration sensor;
   a control signal sensor;
   a current sensor;
   a high frequency current transformer (HFCT) sensor;
   a voltage sensor;
   a power sensor;
   a resistance sensor;
   a capacitance sensor;
   a thermal sensor;
   a fiber Bragg grating (FBG) optical thermographic sensor;
   a pixelated infrared 2D thermographic sensor;
   a bore-hole logging sensor;
   a sensor associated with well drilling;
   a sensor associated with a refinery;
   an accelerometer; a rotational sensor;
   a tachometer;
   a proximity-transducer-based sensor for a rotating shaft;
   a fluid flow sensor;
   a relative humidity sensor;
   an anemometric sensor;
   a time-domain reflectometry (TDR) sensor;
   an ultra high frequency (UHF) sensor;
   an acoustic sensor; and
   a flexible magnetic coupler (FMC) sensor.

8. The method of claim 1, wherein N≤10.

9. A non-transitory computer-readable storage medium storing instructions that when executed by a computer cause the computer to perform a method for detecting sensor anomalies in a univariate time-series signal, wherein during a surveillance mode, the method comprises:
   receiving the univariate time-series signal from a sensor in a monitored system;
   performing a staggered-sampling operation on the univariate time-series signal to produce N sub-sampled time-series signals, wherein the staggered-sampling operation allocates consecutive samples from the univariate time-series signal to the N sub-sampled time-series signals in a round-robin ordering;
   using a trained inferential model to generate estimated values for the N sub-sampled time-series signals based on cross-correlations with other signals in the N sub-sampled time-series signals;
performing an anomaly detection operation to detect incipient sensor anomalies in the univariate time-series signal based on differences between actual values and the estimated values for the N sub-sampled time-series signals; and
when an incipient sensor anomaly is detected, generating a notification.

10. The non-transitory computer-readable storage medium of claim 9, wherein performing the anomaly detection operation comprises:
performing a pairwise differencing operation between the actual values and the estimated values for the N sub-sampled time-series signals to produce residuals;
performing a sequential probability ratio test (SPRT) on the residuals to produce SPRT alarms with associated tripping frequencies; and
detecting incipient sensor anomalies based on the tripping frequencies.

11. The non-transitory computer-readable storage medium of claim 9, wherein during a training mode that precedes the surveillance mode, the method further comprises:
receiving a prior univariate time-series signal from the sensor in the monitored system during normal fault-free operation;
performing a staggered-sampling operation on the prior univariate time-series signal to produce training data comprising N prior sub-sampled signals;
dividing the training data into a training set and a validation set;
using the training set to train the inferential model to predict values of the N prior sub-sampled time-series signals based on cross-correlations with other signals in the N prior sub-sampled time-series signals; and
using the validation set to test the trained inferential model.

12. The non-transitory computer-readable storage medium of claim 9, wherein the incipient sensor anomalies comprise one of the following:
a linear decalibration bias in a sensor;
an intermittent stuck-at fault in a sensor;
an onset of spikiness in a sensor transducer;
a sensor becoming unresponsive to high-frequency fluctuations; and
a changing gain failure in a sensor.

13. The non-transitory computer-readable storage medium of claim 9, wherein the inferential model comprises one of the following:
a multivariate state estimation technique (MSET) model;
a neural network model;
a support vector machine (SVM) model;
an auto-associative kernel model; and
a regression model.

14. The non-transitory computer-readable storage medium of claim 9,
further comprising receiving multiple univariate time-series signals; and
wherein the method performs the staggered-sampling operation, the value-estimation operation and the anomaly-detection operation for each of the multiple univariate time-series signals.

15. The non-transitory computer-readable storage medium of claim 9, wherein the sensor in the monitored system comprises one of the following:

a pressure sensor;
a vibration sensor;
a control signal sensor;
a current sensor;
a high frequency current transformer (HFCT) sensor;
a voltage sensor;
a power sensor;
a resistance sensor;
a capacitance sensor;
a thermal sensor;
a fiber Bragg grating (FBG) optical thermographic sensor;
a pixelated infrared 2D thermographic sensor;
a bore-hole logging sensor;
a sensor associated with well drilling;
a sensor associated with a refinery;
an accelerometer; a rotational sensor;
a tachometer;
a proximity-transducer-based sensor for a rotating shaft;
a fluid flow sensor;
a relative humidity sensor;
an anemometric sensor;
a time-domain reflectometry (TDR) sensor;
an ultra high frequency (UHF) sensor;
an acoustic sensor; and
a flexible magnetic coupler (FMC) sensor.

16. The non-transitory computer-readable storage medium of claim 9, wherein $N \leq 10$.

17. A system that detects sensor anomalies in a univariate time-series signal, comprising:
at least one processor and at least one associated memory; and
an anomaly detection mechanism that executes on the at least one processor, wherein during operation, the anomaly detection mechanism:
receives the univariate time-series signal from a sensor in a monitored system;
performs a staggered-sampling operation on the univariate time-series signal to produce N sub-sampled time-series signals, wherein the staggered-sampling operation allocates consecutive samples from the univariate time-series signal to the N sub-sampled time-series signals in a round-robin ordering;
uses a trained inferential model to generate estimated values for the N sub-sampled time-series signals based on cross-correlations with other signals in the N sub-sampled time-series signals;
performs an anomaly detection operation to detect incipient sensor anomalies in the univariate time-series signal based on differences between actual values and the estimated values for the N sub-sampled time-series signals; and
when an incipient sensor anomaly is detected, generates a notification.

18. The system of claim 17, wherein while performing the anomaly detection operation, the anomaly detection mechanism:
performs a pairwise differencing operation between the actual values and the estimated values for the N sub-sampled time-series signals to produce residuals;
performs a sequential probability ratio test (SPRT) on the residuals to produce SPRT alarms with associated tripping frequencies; and
detects incipient sensor anomalies based on the tripping frequencies.

19. The system of claim 17, wherein during a training mode that precedes the surveillance mode, the anomaly detection mechanism:

receives a prior univariate time-series signal from the sensor in the monitored system during normal fault-free operation;

performs a staggered-sampling operation on the prior univariate time-series signal to produce training data comprising N prior sub-sampled signals;

divides the training data into a training set and a validation set;

uses the training set to train the inferential model to predict values of the N prior sub-sampled time-series signals based on cross-correlations with other signals in the N prior sub-sampled time-series signals; and uses the validation set to test the trained inferential model.

20. The system of claim 17, wherein the incipient sensor anomalies comprise one or more of the following:

a linear decalibration bias in a sensor;

an intermittent stuck-at fault in a sensor;

an onset of spikiness in a sensor transducer;

a sensor becoming unresponsive to high-frequency fluctuations; and a changing gain failure in a sensor.

\* \* \* \* \*